(12) United States Patent
Giaraffa et al.

(10) Patent No.: US 10,967,585 B2
(45) Date of Patent: Apr. 6, 2021

(54) COMPOSITE STRUCTURES AND METHODS OF FORMING COMPOSITE STRUCTURES

(71) Applicant: Guerrilla Industries LLC, Denver, CO (US)

(72) Inventors: Matt Giaraffa, Denver, CO (US); William Montague, Denver, CO (US)

(73) Assignee: GUERRILLA INDUSTRIES LLC, Denver, CO (US)

( * ) Notice: Subject to any disclaimer, the term of this patent is extended or adjusted under 35 U.S.C. 154(b) by 153 days.

(21) Appl. No.: 15/921,410

(22) Filed: Mar. 14, 2018

(65) Prior Publication Data

US 2018/0264756 A1    Sep. 20, 2018

Related U.S. Application Data

(60) Provisional application No. 62/472,397, filed on Mar. 16, 2017.

(51) Int. Cl.
*B32B 3/24*    (2006.01)
*B29C 70/46*    (2006.01)
(Continued)

(52) U.S. Cl.
CPC .......... *B29C 70/465* (2013.01); *B29C 33/505* (2013.01); *B29C 70/081* (2013.01);
(Continued)

(58) Field of Classification Search
CPC .................................. B32B 3/26; B32B 3/266
(Continued)

(56) References Cited

U.S. PATENT DOCUMENTS 3,075,573 A    1/1963    Piazze et al.
3,684,645 A    8/1972    Temple et al.
(Continued)

FOREIGN PATENT DOCUMENTS

EP            0440753        6/1994
WO    WO 2015/095966    7/2015

OTHER PUBLICATIONS

International Search Report and Written Opinion for International (PCT) Patent Application No. PCT/US18/22365, dated Jun. 4, 2018 11 pages.
(Continued)

*Primary Examiner* — William P Watkins, III
(74) *Attorney, Agent, or Firm* — Sheridan Ross P.C.

(57) ABSTRACT

Composite structures and methods of forming composite structures are provided. The composite structures can include one or more composite structure components. Each composite structure component is formed from a composite panel that includes one or more sheets of material. The sheets of material include a thermoplastic material and a plurality of reinforcing fibers. A composite panel can be formed in three dimensions to form a composite structure component. Multiple composite structure components can be fused to one another to form a composite structure. In addition, each composite structure component and the composite structure formed therefrom can include an aperture. An interior volume can be formed between adjacent composite structure components. Methods for forming a composite structure can include a step of simultaneously molding and fusing composite structure components.

20 Claims, 6 Drawing Sheets

(51) Int. Cl.
*B32B 3/26* (2006.01)
*B32B 27/08* (2006.01)
*B32B 27/34* (2006.01)
*B29C 33/50* (2006.01)
*B29C 70/44* (2006.01)
*B29C 70/08* (2006.01)
*B29K 105/12* (2006.01)
*B29K 77/00* (2006.01)
*B29K 307/04* (2006.01)
*B29L 31/30* (2006.01)
*B29K 101/12* (2006.01)

(52) U.S. Cl.
CPC .............. *B29C 70/44* (2013.01); *B32B 3/266* (2013.01); *B32B 27/08* (2013.01); *B32B 27/34* (2013.01); *B29K 2077/00* (2013.01); *B29K 2101/12* (2013.01); *B29K 2105/12* (2013.01); *B29K 2307/04* (2013.01); *B29L 2031/3091* (2013.01); *B32B 2262/106* (2013.01); *B32B 2605/00* (2013.01)

(58) Field of Classification Search
USPC ........................................................ 264/515
See application file for complete search history.

(56) References Cited

U.S. PATENT DOCUMENTS

| | | | |
|---|---|---|---|
| 4,548,422 A | 10/1985 | Michel et al. | |
| 4,613,146 A | 9/1986 | Sharp et al. | |
| 4,902,458 A | 2/1990 | Trimble | |
| 5,011,172 A | 4/1991 | Bellanca et al. | |
| 5,194,212 A | 3/1993 | Bonnett | |
| 5,246,275 A | 9/1993 | Arredondo, Jr. | |
| 5,262,118 A | 11/1993 | Fukushima et al. | |
| 5,350,556 A | 9/1994 | Abe et al. | |
| 5,415,463 A | 5/1995 | Olson et al. | |
| 5,456,481 A | 10/1995 | Allssop et al. | |
| 5,464,240 A | 11/1995 | Robinson et al. | |
| 5,624,519 A | 4/1997 | Nelson et al. | |
| 5,641,366 A | 6/1997 | Hohman | |
| 5,769,442 A | 6/1998 | Robinson et al. | |
| 5,853,651 A | 12/1998 | Lindsay et al. | |
| 5,948,505 A | 9/1999 | Puppin | |
| 5,985,197 A | 11/1999 | Nelson et al. | |
| 6,042,765 A | 3/2000 | Sugahara et al. | |
| 6,165,407 A | 12/2000 | Tahara et al. | |
| 6,248,024 B1 | 6/2001 | Nelson et al. | |
| 6,270,104 B1 | 8/2001 | Nelson et al. | |
| 6,340,509 B1 | 1/2002 | Nelson et al. | |
| 6,352,485 B1 | 3/2002 | Philpot et al. | |
| 6,761,187 B1 | 7/2004 | Zoellner | |
| 8,117,679 B2 | 2/2012 | Pierce | |
| 8,863,616 B2 | 10/2014 | Ciavatta et al. | |
| 9,688,097 B2 | 6/2017 | Meggiolan et al. | |
| 2002/0017745 A1 | 2/2002 | Vorenkamp et al. | |
| 2006/0038375 A1 | 2/2006 | Parkin | |
| 2009/0212530 A1 | 8/2009 | Sasnowski et al. | |
| 2013/0036693 A1* | 2/2013 | Lee .......................... | E04B 5/36 52/309.1 |
| 2014/0037888 A1 | 2/2014 | O'Reilly et al. | |
| 2014/0191492 A1 | 7/2014 | Al-Sheyyab et al. | |
| 2014/0352036 A1 | 12/2014 | Ballarin | |
| 2015/0119482 A1 | 4/2015 | Kumar et al. | |
| 2015/0151464 A1 | 6/2015 | Takano et al. | |
| 2017/0226674 A1 | 8/2017 | Jerez | |

OTHER PUBLICATIONS

"0/90 Degree Carbon Fiber Uni Sheet~ 1/16" x 6" x6"" DragonPLate™, 2017, 2 pages [retrieved online from: dragonplate.com/ecart/product.asp?pID=4879&cID=139].
"DragonPlate Carbon Fiber Laminate FAQ," DragonPlate™, 2017, 2 pages [retrieved online from: dragonplate.com/faq.asp].
International Preliminary Report on Patentability for International (PCT) Application No. PCT/US2018/022365, dated Sep. 26, 2019, 10 pages.
Extended European Search Report for European Patent Application No. 187674571; dated Nov. 19, 202, 11 pages.

* cited by examiner

COMPOSITE STRUCTURES AND METHODS OF FORMING COMPOSITE STRUCTURES

CROSS-REFERENCE TO RELATED APPLICATIONS

This application claims the benefit of U.S. Provisional Patent Application Ser. No. 62/472,397, filed Mar. 16, 2017, the entire disclosure of which is hereby incorporated herein by reference.

FIELD

The present disclosure provides composite structures and methods of forming composite structures. More particularly, embodiments of the present disclosure utilize a material having reinforcing fibers embedded in a thermoplastic material that is molded into a desired configuration to create composite structures.

BACKGROUND

Composite materials have a variety of advantages as compared to alternate materials, such as steel, aluminum, or wood. For example, composite materials can be used to form structures having intricate shapes, allowing strength and aesthetics to be optimized. In addition, the potential strength to weight ratio of structures formed using carbon fiber composites is very high. Products formed from carbon fiber composites, commonly referred to as simply "carbon fiber", are also popular with consumers.

Widespread adoption of composite materials has been limited by the relatively high cost of forming composite or carbon fiber structures. These costs are a result of various factors, such as the cost of the materials themselves, and the labor-intensive processes used to form such structures. For example, composite structures are typically formed by laying multiple sheets of composite material in a mold. Each sheet includes fibers that are oriented along one or several directions or plies, and that generally extend from one edge of the sheet to another. More particularly, different layers of material, having the associated ply or plies oriented in a specific direction, are placed in a mold and set into a final form using a two-part epoxy. In addition to being time-consuming and labor-intensive, such techniques are prone to defects when used to form complex, hollow structures time efficiently. Such methods are also unable to take full advantage of the strength to weight ratio of the material. For example, conventional composite structures that are otherwise capable of withstanding designed loads require additional reinforcement in order to provide consumer friendly end products that are resistant to impacts and that have acceptable product lifetimes. In addition, composite structures have typically used thermoset materials that are relatively brittle and difficult to recycle.

As an alternative to composite structures that are formed by layering multiple sheets of material in a mold, structures can be formed relatively quickly and cheaply using injection molding. However, the structures formed using such processes are typically quite weak. In addition, it is impossible to form certain three-dimensional shapes using injection molding.

SUMMARY

Embodiments of the present disclosure provide composite structures and methods of forming composite structures. The composite structures comprise composite panels that include one or more sheets of thermoplastic fiber reinforced material. The composite panels can comprise slits or apertures formed therein. In accordance with further embodiments of the present disclosure, multiple composite panels can be joined to one another to form composite structures. The composite structures can include at least portions that are hollow. Each composite panel in a composite structure can be joined to at least one other composite panel by a welding process.

In accordance with embodiments of the present disclosure, each composite panel comprises one or more composite sheets of material that include a plurality of fibers embedded in a thermoplastic material. In accordance with at least some embodiments of the present invention, at least one of the sheets of material in a composite panel includes fibers that are randomly oriented. Moreover, the randomly oriented fibers may be relatively short, such that most of the fibers do not extend from one edge of the sheet to another. Alternatively or in addition, at least one of the sheets of material in a composite panel includes unidirectional fibers, with at least most of the fibers extending between different edges of the sheet of material. The composite panel can additionally include one or layers of core or spacer material between otherwise adjacent sheets of material. In accordance with at least some embodiments of the present invention, the composite panel includes at least one slit or aperture that is within a perimeter of the composite panel. In accordance with still further embodiments of the present disclosure, the slit or aperture extends through all of the sheets making up the composite panel.

A composite structure as disclosed herein can incorporate multiple composite panels. In accordance with at least some embodiments of the present disclosure, a composite structure includes a three-dimensional composite structure component that includes at least one composite panel that is joined to a second composite structure component that includes at least one composite panel. The second composite structure component can also be formed in three dimensions. In addition, each of the composite structure components, and the resulting composite structure, can have an aperture formed within an outer perimeter thereof. The composite structure can also feature at least one hollow section, between adjacent portions of the first and second composite structure components. In accordance with further embodiments of the present disclosure, the first and second composite structure components can be joined to one another by welding. Moreover, a welding strip in the form of the thermoplastic material of the panels, either alone or in combination with one or more plies of fibers, can extend across a joint or interface between the first and second composite structure components.

Methods of forming composite panels can include layering multiple composite sheets of thermoplastic impregnated fiber materials, and fusing the multiple sheets using heat and pressure. The different sheets can be selected to provide fibers of a desired tensile strength, length, and orientation or orientations relative to the perimeter of the respective sheet. In addition, the sheets can be oriented with respect to one another to provide strength in desired directions.

Methods of forming composite structures in accordance with embodiments of the present disclosure include placing a composite panel in a female mold and applying pressure to the composite panel with a male mold, to form a three-dimensional composite structure component. The composite panel can have a slit or aperture formed therein prior to placing the panel in the molds. A first three-dimensional composite structure component can be joined to a second three-dimensional composite structure component to form a completed composite structure. In accordance with further embodiments, the composite structure can include more than two composite structure components. Moreover, at least some of the composite structure components can be flat, rather than formed in three dimensions. The composite structure can include an aperture within an outside perimeter of the structure that extends through multiple composite structure components. Alternatively or in addition, the composite structure can include one or more hollow portions formed between adjacent sections of composite structure components.

Methods of joining composite structure components include welding adjacent components to one another. Welding adjacent components can include applying heat to the area of the joint, to raise the temperature of the components to a point that is greater than the glass transition temperature and up to the melt temperature of the thermoplastic material. In accordance with at least some embodiments of the present disclosure, a joint between adjacent composite structure components is formed by abutting edges of the adjacent components. In addition, a welding strip, which can be a strip of the same thermoplastic material present in the composite structure components, with or without fibers, can be placed along the joint while heat is applied to the joint. In accordance with still further embodiments of the present disclosure, the welding strip can be located within a hollow area of the composite structure, and can be pressed against the composite structure components that are being joined by an inflated bladder, a mandrel, or the like, while heat is being applied to form the joint.

Additional features and advantages of embodiments of the present disclosure will become more readily apparent from the following description, particularly when considered together with the accompanying drawings.

DETAILED DESCRIPTION

Figure 1:
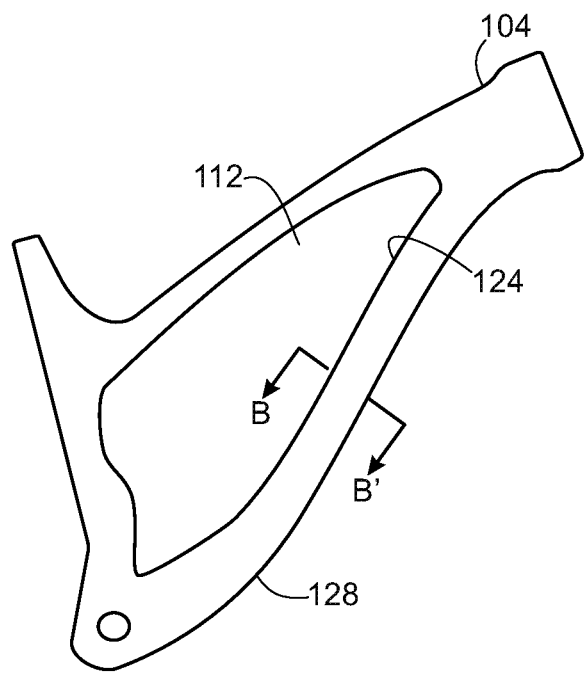
FIG. 1 depicts an example composite structure in accordance with embodiments of the present disclosure.
Figure 2:
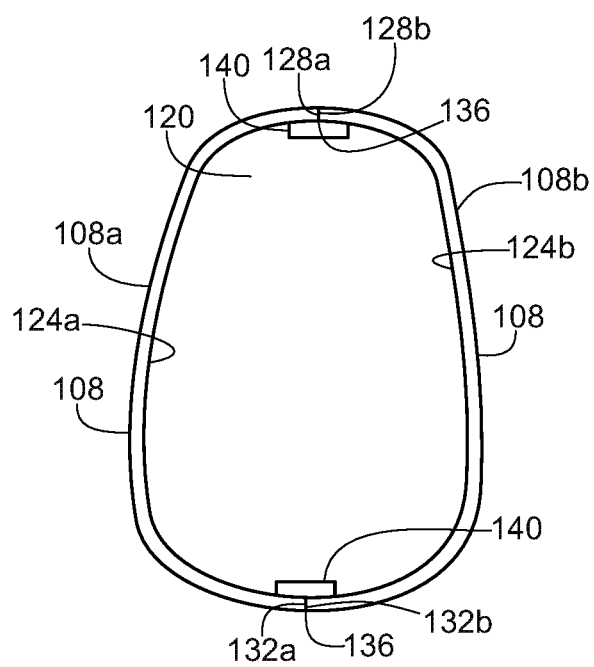
FIG. 2 depicts an example composite structure in a cross-section taken along line B-B' of FIG. 1.

FIG. 1 depicts an example composite structure 104 in accordance with embodiments of the present disclosure, and FIG. 2 depicts the composite structure 104 in a cross-section taken along line B-B' in FIG. 1. In this example, the composite structure is a main portion of a bicycle frame. However, it should be appreciated that other products comprising unitary or multipart structures can be formed using embodiments of the present disclosure. In particular, composite structures 104 as disclosed herein can be used to form all or portions of various products, including products having complex shapes, a high-strength to weight ratio, and excellent impact resistance. Moreover, as described herein, composite structures 104 can be formed with reduced costs, including reduced labor and production costs, and with reduced manufacturing time, as compared to conventional composite structures 104.

The example composite structure 104 is formed using multiple composite structures or component parts 108a and 108b (see FIG. 2), and includes an aperture 112 (see FIG. 1) formed within an outside perimeter of the composite structure 104. The composite structure components 108 are formed in three dimensions, and when joined create a hollow space or interior volume 120 between adjacent interior portions or surfaces 124a and 124b of the components 108. In addition, the composite structure components 108 are joined to one another along corresponding inside edge portions 128a and 128b and outside edge portions 132a and 132b. In accordance with at least some embodiments of the present disclosure, the respective inside edge portions 128a and 128b and outside edge portions 132a and 132b are welded to one another, forming a welded joint 136. In accordance with at least some embodiments of the present disclosure, a welding strip 140 can be provided adjacent to some or all of the joints 136. Alternatively or in addition, a composite structure component 108 can include a joggle that overlaps some or all of the joints 136.

Each composite structure component 108 may, for example, comprise one half of the completed composite structure 104. In addition, the first composite structure component 108a and the second composite structure component 108b may mirror one another. However, such a configuration is not a requirement. In addition, a composite structure 104 can include any number of composite structure components 108. Moreover, a single composite structure component 108 can be joined to multiple other composite structure components 108.

Figure 3A:
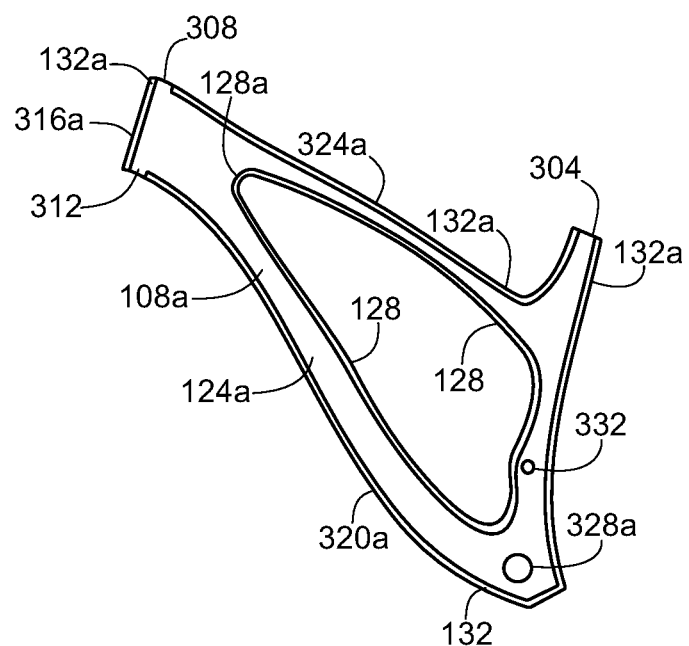
FIGS. 3A-B depict composite structure components in accordance with embodiments of the present disclosure.
Figure 3B:
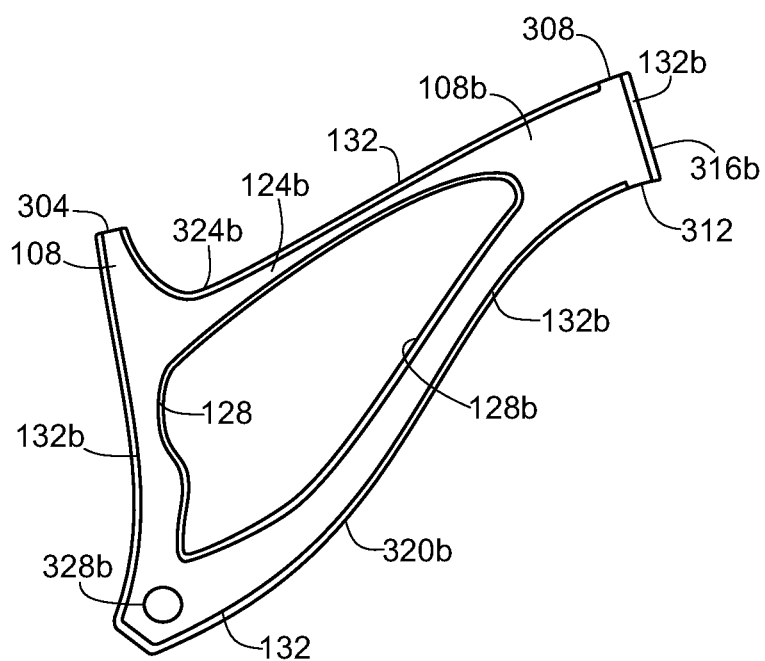

With reference now to FIGS. 3A-B, example composite structure components 108 are shown in a plan view looking at the interior surfaces 124a and 124b of the respective components 108a and 108b. More particularly, FIG. 3A illustrates the inside surface 124a, the inside edge portions 128a, and the outside edge portions 132a of the first composite structure component 108a, while FIG. 3B illustrates the inside surface 124b, the inside edge portions 128b, and the outside edge portions 132b of the second composite structure component 108b.

The inside edge portions 128 and/or the outside edge portions 132 can be continuous, or can include discontinuities. Moreover, the inside edge portions 128 and/or the outside edge portions 132, can be provided in multiple sections. The example composite structure components 108 depicted in FIGS. 3A and 3B include continuous inside edge portions 128. The example composite structure components 108 additionally feature outside edge portions 132 that include discontinuities. In particular, a first discontinuity is present in an area corresponding to a seat post aperture 304, and second and third discontinuities are present in areas corresponding to the top 308 and bottom 312 of a head tube portion of the composite structure 104. As a result of this configuration, the outside edge portions 132 of the example composite structure components 108 are provided in multiple sections: a first section 316*a* and 316*b* between the top 308 and bottom 312 of the head tube portion, a second section 320*a* and 320*b* between the bottom 312 of the head tube portion and the seat post aperture 304, and a third section 324*a* and 324*b* between the seat post aperture 304 and the top 308 of the head tube portion.

In addition, one or more auxiliary apertures can be formed between the inside edge portion 128 and the outside edge portion 132 of one or both of the composite structure components 108. For example, a first auxiliary aperture 328*a* may be formed in first composite structure component 108*a* and a corresponding first auxiliary aperture 328*b* may be formed in the second composite structure component 108*b* to accommodate a bottom bracket assembly. As another example, a second auxiliary aperture 332 may be formed in the first composite structure component 108*a* only, to provide a mounting point for a component or accessory.

Figure 4:
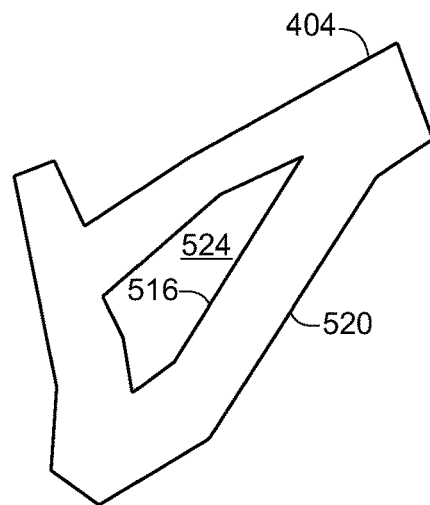
FIG. 4 depicts a composite panel in accordance with embodiments of the present disclosure in a plan view.
Figure 5:
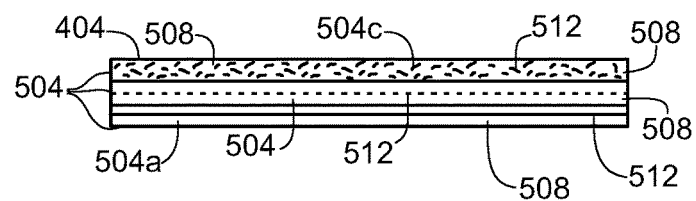
FIG. 5 depicts a composite panel in accordance with embodiments of the present disclosure in a side elevation view.

In accordance with embodiments of the present disclosure, each composite structure component 108 is formed from a composite panel 404. An example composite panel 404, before the forming process has been performed, is depicted in FIGS. 4 and 5. As shown, the composite panel 404 may comprise a planar panel prior to molding to form a composite structure component 108. The composite panel 404 generally includes a plurality of composite sheets 504 that have been fused or welded to form the composite panel 404. Each composite sheet 504 includes a thermoplastic material 508 and a plurality of fibers 512 embedded therein. The composite sheets 504 are fused to one another through the application of heat and pressure. FIG. 4 depicts a composite panel 404 after trimming of the completed composite panel 404 or the individual sheets 504, to define inside edges 516 and outside edges 520. The inside edges 516 define an aperture 524 in the composite panel 404. Some or all of the inside edges 516 may be coincident with the inside edge or edges 128 of the formed composite structure component 108. In addition, some or all of the outside edges 520 may be coincident with the outside edge or edges 132 of the composite structure component 108. Alternatively, the edges 516 and 520 can approximate the respective edges 128 and 132 of the composite structure component 108. As discussed in greater detail elsewhere herein, the edges 128 and 132 of the composite structure component 108 can be formed by trimming after the composite panel 404 has been molded into the three-dimensional shape of the composite structure component 108.

Figure 6:
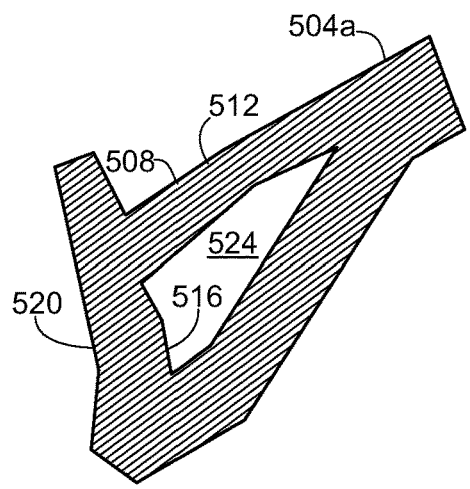
FIG. 6 depicts a sheet of thermoplastic reinforced material in accordance with an embodiment of the present disclosure.
Figure 7:
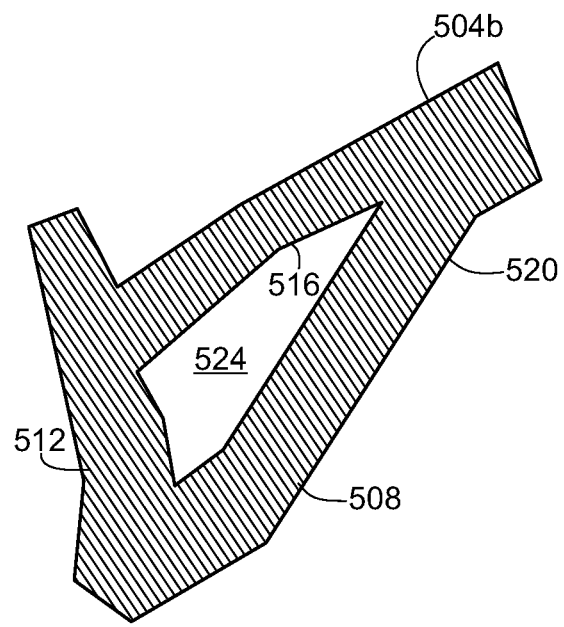
FIG. 7 depicts a sheet of thermoplastic reinforced material in accordance with another embodiment of the present disclosure.
Figure 8:
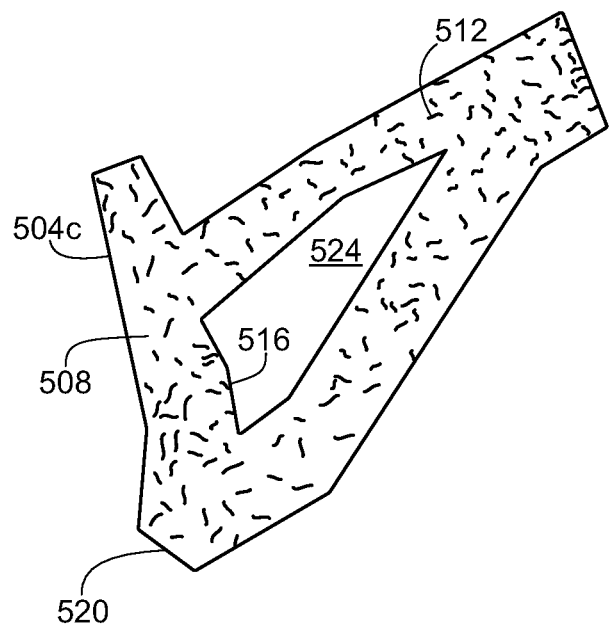
FIG. 8 depicts a sheet of thermoplastic reinforced material in accordance with another embodiment of the present disclosure.

Different composite sheets 504 within a composite panel 404 can have different fiber 512 orientations and configurations, as illustrated in FIGS. 5-8. For example, one or more composite sheets 504 within a composite panel 404 can feature relatively long fibers 512 that can extend between adjacent edges of the sheet 504. Such a configuration is illustrated in FIGS. 6 and 7, with fibers 512 that extend between different outside edges 520, or between an outside edge 520 and an inside edge 516. The composite sheets 504*a* and 504*b* with relatively long fibers 512 can have those fibers configured unidirectionally, such that the fibers 512 extend in the same general direction. In accordance with further embodiments, the fibers 512 can be parallel or substantially parallel to one another. As used herein, fibers 512 are substantially parallel if they extend along a common direction +/−10°. Moreover, two or more sheets 504 having relatively long fibers 512 can be aligned such that the fibers 512 of one composite sheet 504 are at a nonzero angle with respect to the fibers 512 of another one of the composite sheets 504. Alternatively or in addition, one or more of the composite sheets 504 can have relatively short, randomly oriented fibers 512. More particularly, the fibers 512 can be randomly oriented in at least a plane encompassing the edges of the composite sheet 504 when that sheet 504 is in a flat configuration. FIG. 8 depicts a composite sheet 504*c* having randomly oriented fibers 512 embedded within a thermoplastic material 508. As shown, the fibers 512 in this example are relatively short, and generally do not extend between opposite edges 516 and 520 of the composite sheet 504. In accordance with still other embodiments, the fibers 512 within a composite sheet 504 can be woven, with subsets of fibers and selected angles with respect to other subsets of fibers within the composite sheet 504.

An example layout is illustrated in FIG. 5, with a first composite sheet 504*a* comprising a first layer that has relatively long fibers 512 oriented in a first direction, a second composite sheet 504*b* comprising a second layer having relatively long fibers 512 oriented in a second direction, which in this example is orthogonal to the first direction, and a third composite sheet 504*c* comprising a third layer having relatively short fibers 512 in random orientations within the thermoplastic material 508. In an exemplary embodiment, the first composite sheet 504*a* may form an inside surface 124 of a finished composite structure component 108, while the third composite sheet 504*c* may form an exterior surface of the finished composite structure component 108. In addition, embodiments of the present disclosure can include spacer or filler sheets or layers between sheets 504 containing thermoplastic material 508 and fibers 512. A spacer of filler layer a filler material, such as a glass or foam embedded in or impregnated with a thermoplastic material 508.

In accordance with at least some embodiments of the present disclosure, the composite panel 404 is formed as a planar or substantially planar panel from textile like composite sheets 504. The individual sheets may or may not be flexible at room temperature. Each of the composite sheets 504 may be in the form of a substantially continuous sheet, for example in the shape of a rectangle, that is trimmed to form edges 516 and 520, and one or more apertures 524, before they are initially stacked with one another to form the layup of the composite panel 404. Alternatively, some or all of the composite sheets 504 may be trimmed after being fused to one or more other composite sheets 504. Whether formed in individual or sub-sets of composite sheets 504, or in a completed composite panel 404, the edges 516 and 520 generally follow a pattern that approximates the shape of the composite structure component 108 that will be formed from the composite panel 404. In addition, all or portions of the edges 516 and 520 can include fringes or slots, and one or more apertures 524 can be formed within the outer perimeter of the composite panel 404, to assist in obtaining a desired three-dimensional composite structure component 108 from the composite panel 404.

Figure 9:
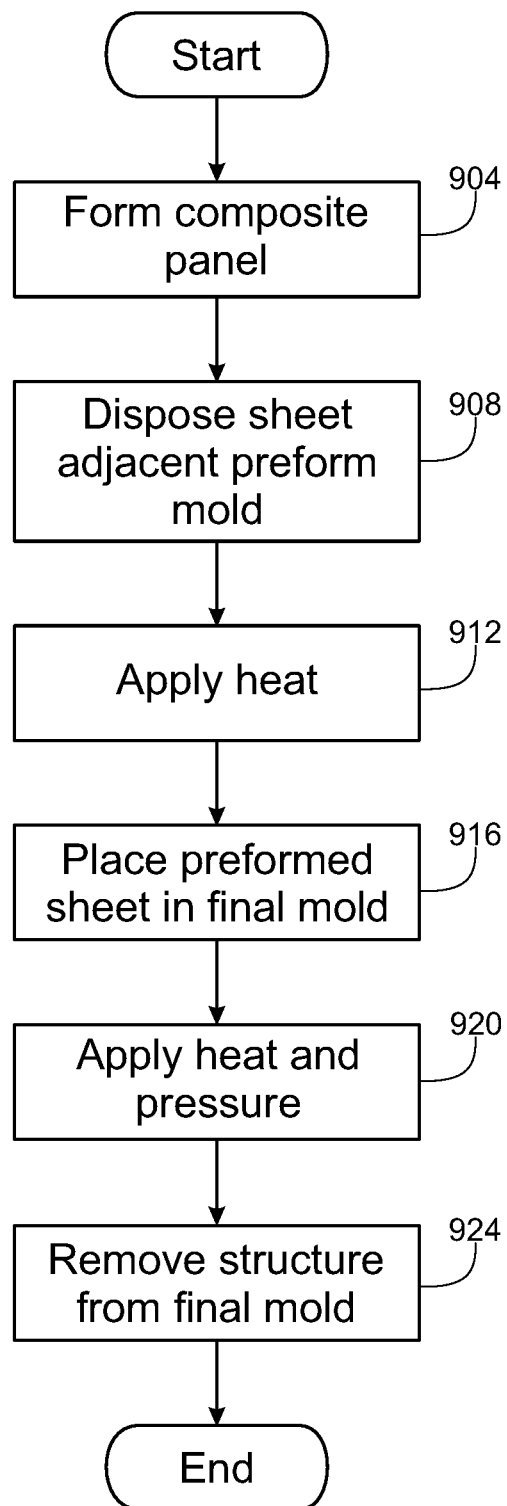
FIG. 9 is a flowchart illustrating aspects of forming a composite structure in accordance with embodiments of the present disclosure.

With reference now to FIG. 9, aspects of a process for producing a composite structure 104 in accordance with embodiments of the present disclosure are depicted. Initially, at step 804, a single composite panel 404 is formed. Forming the composite panel 404 can include selecting or forming from a larger piece of material one or more sheets 504 of appropriate size. In addition, forming the composite panel 404 can include creating a layup or stack of composite sheets 504, with different composite sheets 504 having a selected fiber 512 and orientation relative to the other sheets 504. The stack can include one or more spacer layers containing a filler material, but not fibers, and the same thermoplastic material as the thermoplastic material 508 of the other sheets 504. The composite sheets 504, and any spacer layers, within the stack are then fused using heat and pressure, to form the composite structure 404. More particularly, forming the composite panel 404 can include heating the thermoplastic material 508 in the composite sheets 504 to greater than the above the melting point of the thermoplastic material in order to fuse the composite sheets 504 to one another. The pressure applied during the composite panel 404 forming process can be greater than 100 psi. In further embodiments, the pressure applied during the composite panel 404 forming process can be greater than 400 psi. In still other embodiments, the pressure applied during the composite panel 404 forming process can be greater than 1000 psi. The composite panel 404 may have a generally flat or planar configuration, Alternatively, the panel 404 may be given a contour or may be shaped in three-dimensions, for example to approximate a final shape of the composite structure component 108 formed from the composite panel 404, and/or the final mold. In accordance with at least some embodiments of the present disclosure, the individual composite sheets 504 may be trimmed to form inside 516 and outside 520 edges prior to fusing. Alternatively, the composite sheets 504 may be provided in a common shape, such as rectangles, and fused to form a composite panel 404 that is then trimmed to form the edges 516 and 520.

Figure 10:
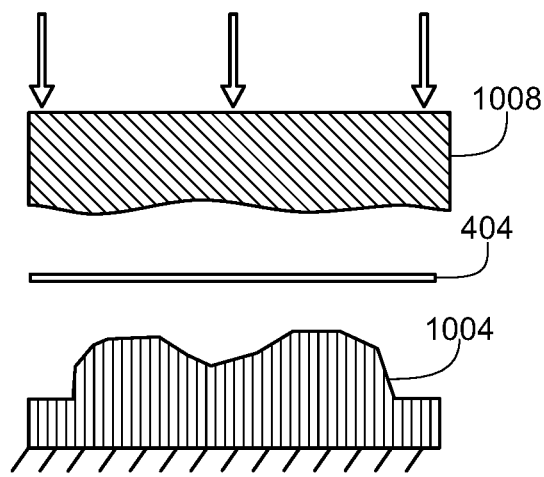
FIG. 10 depicts a preform step in accordance with embodiment of the present disclosure.

The composite panel 404 is then disposed on or adjacent a preform mold 1004 (see FIG. 10) (step 908). The composite panel 404 is made pliable by applying heat (step 912). For example, a heated fluid or a matched mold 1008 can be applied to a side of the composite panel 404 opposite the side adjacent the preform mold 1004, causing the composite panel 404 to conform to or approximate the shape of the mold 1004. Alternatively or in addition, the preform mold 1004 itself can be heated. In general, the heating of the composite panel 404 is controlled so as to maintain the temperature of the thermoplastic material 508 within the fused composite sheets 504 of the composite panel 404 to a temperature that is at or above the glass transition temperature and at or below the melting temperature of the thermoplastic material 508. The preform molding step forms a preformed composite panel 1104. In accordance with at least some embodiments of the present disclosure, the step of preforming, to create a preformed composite panel need not be performed, and the composite panel 504 can be placed in a final mold as a planar or substantially planar element.

Figure 11:
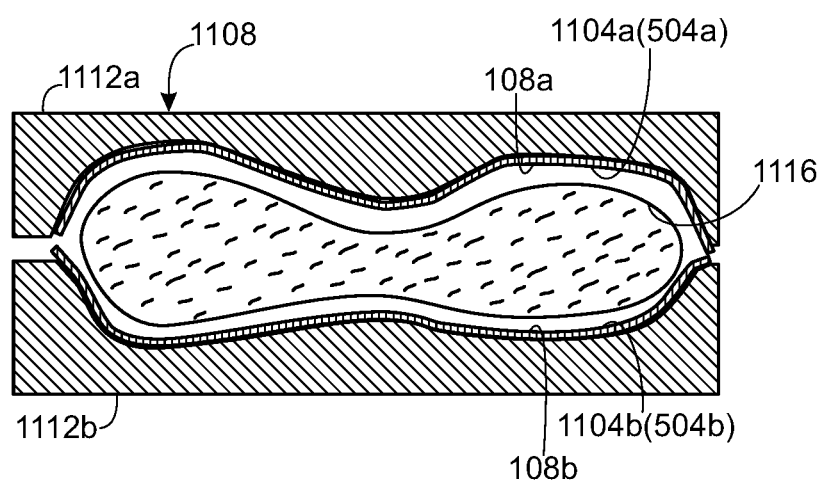
FIG. 11 depicts a final shaping and forming step in accordance with embodiments of the present disclosure.

At step 916, the preformed composite panel 1104, or if no preforming is performed, the composite panel 504, is placed in a final mold 1108 (see FIG. 11). Moreover, as depicted in FIG. 11, a set of preformed composite panels 1104a and 1104b or composite panels 404a and 404b can each be placed in final, negative or female mold halves 1112a and 1112b. The preformed composite panels 1104a and 1104b or composite panels 404a and 404b can be configured as mirror images of one another, at least with respect to the layup of composite sheets 504 within the panels 404 from which the preformed composite panels 1104a and 1104b or composite panels 404a and 404b were formed, and with respect to the general outline of the edges 516 and 520. In addition, a welding strip 140 can be attached adjacent the joints between the complementary inside 516 and outside 520 edges. The preformed composite panels 1104a and 1104b or composite panels 404a and 404b can then be conformed to the shape of the final mold 1108 by applying heat and pressure (step 920). The application of pressure can be achieved using a male mold or solid mandrel, such as but not limited to a mandrel formed from a material with a high coefficient of thermal expansion, such as silicone. Alternatively, as depicted in FIG. 11, pressure can be applied using an inflatable bladder 1116 placed on a side of the preformed composite panel 1104 or composite panel 404 opposite the side that is adjacent to the final mold 600. In addition, multiple final molds 1108 can be used in combination. For example, in the depicted example, the final mold 1108 includes complementary first 1112a and second 1112b mold components. Where multiple, preformed composite sheets 1104 or composite sheets 504 are placed in complementary final molds 1112a and 1112b at the same time, a single bladder 1116 can be used to apply pressure to the composite sheets 1104 or 404 simultaneously.

The formed composite structure 104, in the three-dimensional shape imparted by the final mold 1108, is then cooled and removed from the final mold 1108 (step 924). The composite structure 104 is then ready for final finishing, such as sanding and painting. Individual structures 104 formed from one or multiple composite panels 404, can be joined together to form larger composite structures during or after a step of final molding. Accordingly, the formation of composite structure components 108 in their final form, and the formation of the composite structure 104 from such components 108, can be performed simultaneously. For instance, as shown in FIG. 11, multiple preformed composite panels 1104 and/or multiple composite panels 404 can be fused to one another during a step of final molding. As another example, composite structures 104 can be joined together after final molding by fusing or bonding the different structures, including unitary or multiple component structures 104, to one another, forming a larger composite structure. Fusing can include reheating the individual structure in the area of the joint to a temperature that is at or less than the melting point of the composite, and at or higher than the heat deflection temperature, per ASTM D648, of the composite. As still another example, structures 100 formed from multiple sub-structures can be bonded to one another using an adhesive. The joint at the seam or interface between the individual composite structures can be a butt joint, a lap joint, or can include different types of joints at different locations.

As discussed herein, the composite sheets 504 can include one or more sheets having a large number of randomly oriented fibers 512 that are impregnated in a thermoplastic material 508. More particularly, the fibers 512 are randomly oriented in at least a plane encompassing the edges of the composite sheet 504 while that sheet is held flat. The composite sheet 504 is relatively thin, for example, but without limitation, having a thickness of from about 2 mm to about 4 mm. The fibers 512 in such a sheet 504 are relatively short, having, for example, but without limitation, a length of from about 4 mm to about 30 mm. Moreover, fibers 512 of different lengths can be incorporated into a single composite sheet 504. In accordance with the exemplary embodiments of the present disclosure, the composite sheets 504 includes from about 1 gram per cubic centimeter to about 2 grams per cubic centimeter of fibers 512. By volume, the ratio of fibers 512 to thermoplastic material 508 can be selected such that from 20% to 70% of the volume comprises fibers 512, and such that the remainder of the volume comprises the thermoplastic material 508. The fibers 512 of a sheet 504 having a unidirectional, woven, or random orientation can comprise fibers having a selected tensile strength. For example, the fibers 512 can have a high modulus or stiffness and/or high tensile strength (e.g. a modulus greater than 280 Gpa and a tensile strength greater than 2,500 Mpa), and can comprise carbon fibers. As another example, fibers 512 of different tensile strengths can be included in a single composite sheet 504. In accordance with at least some embodiments of the present disclosure, the fibers 512 may comprise recycled materials. For instance, the fibers 512 may be obtained from cuttings created in forming sheets of traditional, continuous ply carbon fiber materials. The thermoplastic material 508 can comprise any material that can be formed or re-formed by heating. For example, the thermoplastic material 508 may comprise a polyamide or a thermoplastic resin. In accordance with exemplary embodiments of the present disclosure, the composite sheet 504 weighs from about 1.2 g/cc to about 1.8 g/cc.

According to at least some embodiments of the present disclosure, composite structures 104 or composite structure components 108 are formed by molding one or more composite panels 404 that each include one or more composite sheets 504 containing a thermoplastic material 508 and fibers 512 impregnated with the thermoplastic material 508 into a desired three-dimensional configuration. In accordance with further embodiments of the present disclosure, multiple composite structure components 108 can be fused or otherwise joined together to form a composite structure 104. In accordance with still further embodiments, the formation of a composite structure 104 containing multiple composite structure components 108 that are fused to one another can be performed simultaneously with the molding or final molding of composite panels 404 into the respective composite structure components 108. Moreover, components formed from metal or other materials may be fused to one or more of the composite structure components 108 at the same time that the composite structure components 108 are fused to one another to form the composite structure 104.

In accordance with at least some embodiments of the present disclosure, the technology encompasses:

(1) A composite structure, comprising:
a first component part, the first component part including:
a first sheet of thermoplastic fiber reinforced material, wherein the first sheet has an outsider perimeter, wherein a least a first aperture is formed in the first sheet of thermoplastic fiber reinforced material, and wherein the at least a first aperture is spaced apart from the outside perimeter;
a second component part, the second component part including:
a second sheet of thermoplastic fiber reinforced material, wherein the second sheet has an outside perimeter, wherein at least a first aperture is formed in the second sheet of thermoplastic fiber reinforced material, wherein the at least a first aperture is spaced apart from the outside perimeter, wherein the first component part is joined to the second component part, and wherein an interior volume is formed between at least a first portion of the first component part and a first portion of the second component part.

(2) The composite structure of (1), wherein the outside perimeter of the first sheet forms at least a portion of a first outside edge section of the first component part, wherein the outside perimeter of the second sheet forms at least a portion of a first outside edge section of the second component part, and wherein the first outside edge section of the first component part is joined to the first outside edge section of the second component part.

(3) The composite structure of (1) or (2), wherein the at least a first aperture of the first sheet forms at least a portion of a first inside edge section of the first component part, wherein the first aperture of the second sheet forms at least a portion of a first inside edge section of the second component part, and wherein the first inside edge section of the first component part is joined to the first inside edge section of the second component part.

(4) The composite structure of any of (1) to (3), wherein a first portion of the outside perimeter of the first sheet forms a first outside edge section of the first component part, wherein a second portion of the outside perimeter of the first sheet forms a second outside edge portion of the first component part, and wherein the second outside edge section of the first component part is separated from the second outside edge section of the first component part.

(5) The composite structure of any of (1) to (4), wherein the first sheet includes a first plurality of fibers, wherein one end of each fiber in the first plurality of fibers forms a portion of an outside perimeter of the first component part, wherein another end of each fiber in a first subset of the first plurality of fibers forms a portion of another portion of the outside perimeter of the first component part, and wherein another end of each fiber in a second subset of the plurality of fibers forms a portion of an insider perimeter of the first component part.

(6) The composite structure of any of (1) to (5), wherein the second sheet includes a first plurality of fibers, wherein one end of each fiber in the first plurality of fibers forms a portion of an outside perimeter of the second component part, wherein another end of each fiber in a first subset of the first plurality of fibers forms a portion of another portion of the outside perimeter of the second component part, and wherein another end of each fiber in a second subset of the plurality of fibers forms a portion of an insider perimeter of the second component part.

(7) The composite structure of any of (1) to (6), wherein the first component part further includes:
a third sheet of thermoplastic fiber reinforced material, wherein the third sheet has an outsider perimeter, wherein a least a first aperture is formed in the third sheet of thermoplastic fiber reinforced material, wherein the at least a first aperture is spaced apart from the outside perimeter, wherein the third sheet includes a first plurality of fibers, wherein one end of each fiber in the first plurality of fibers forms a portion of an outside perimeter of the first component part, wherein another end of each fiber in a first subset of the first plurality of fibers forms a portion of another portion of the outside perimeter of the first component part, and wherein another end of each fiber in a second subset of the plurality of fibers forms a portion of an inside perimeter of the first component part.

(8) The composite structure of any of (1) to (6), wherein the first component part further includes:
at third sheet of thermoplastic fiber reinforced material, wherein the third sheet includes a plurality of randomly oriented carbon fibers.

(9) The composite structure of (7) or (8), wherein the third sheet is exterior to the interior volume.

(10) The composite structure of any of (1) to (9), further comprising:
a first welding strip, wherein the first welding strip extends along a joint between the first outside edge section of the first component part and the first outside edge section of the second component part.

In accordance with further aspects of the present disclosure, the technology encompasses:

(11) A composite panel, comprising:
a first sheet, the first sheet including:
a plurality of fibers;

a thermoplastic material, wherein the fibers are embedded in the thermoplastic material; and
an aperture;
a second sheet, the second sheet including:
a plurality of fibers;
a thermoplastic material, wherein the fibers are embedded in the thermoplastic material; and
an aperture,
wherein the first sheet is joined to the second sheet, and wherein at least a portion of the aperture of the first sheet is aligned with at least a portion of the aperture of the second sheet to form an aperture in the composite panel.

(12) The composite panel of (11), wherein the first sheet has edges that define a perimeter, wherein the aperture of the first sheet is entirely within the perimeter of the first sheet, wherein the second sheet has edges that define a perimeter, and wherein the aperture of the second sheet is entirely within the perimeter of the second sheet.

(13) The composite panel of (12), wherein the perimeter of the first sheet includes at least a first side edge and a second side edge, wherein at least some of the fibers included in the plurality of fibers of the first sheet extend from the first side edge to the second side edge, and wherein at least most of the fibers included in the plurality of fibers of the second sheet are not parallel the fibers included in the plurality of fibers of the first sheet.

(14) The composite panel of any of (11) to (13), wherein the fibers included in the plurality of fibers of the second sheet are oriented randomly with respect to a plane extending across the edges of the second sheet.

In accordance with still other aspects of the present disclosure, the technology encompasses:

(15) A method of forming a composite structure, comprising:
forming a first composite panel, wherein the first composite panel includes at least a first sheet of a thermoplastic material containing a plurality of fibers, and wherein at least one aperture is formed in the first composite panel;
heating the first composite panel;
placing the heated first composite panel in a first final mold, wherein the first composite panel is given a first final contour.

(16) The method of (15), further comprising:
forming a second composite panel, wherein the second composite panel includes at least a second sheet of a thermoplastic material containing a plurality of fibers;
heating the second composite panel;
placing the heated second composite panel in the first final mold, wherein the second composite panel is given a second final contour, and wherein the second composite panel is fused to the first composite panel.

(17) The method of (15) or (16), wherein forming the first composite panel includes joining the first sheet to another sheet of thermoplastic material using heat and pressure.

(18) The method of any of (15) to (17), wherein the first sheet includes a plurality of randomly oriented fibers.

(19) The method of any of (15) to (17), wherein the first composite panel includes an outside edge, wherein the first composite panel includes an inside edge that is coincident with the aperture of the first composite panel, wherein at least one aperture is formed in the second composite panel, wherein the second composite panel includes an outside edge, wherein the second composite panel includes an inside edge that is coincident with the aperture of the second composite panel, wherein at least a portion of the outside edge of the first composite panel is fused to at least a portion of the outside edge of the second composite panel, wherein at least a portion of the inside edge of the first composite panel is fused to at least a portion of the inside edge of the second composite panel, and wherein fusing the respective edges of the first and second composite panels is performed simultaneously.

(20) The method of any of (15) to (19), wherein the first and second composite panels are formed at a temperature greater than a melting point of the thermoplastic material, and wherein fusing the first composite panel to the second composite panel at a temperature of greater than or equal to a glass transition temperature of the thermoplastic material and less than or equal to the melting point of the thermoplastic material.

The foregoing discussion has been presented for purposes of illustration and description. Further, the description is not intended to limit the disclosed structures, systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed structures, systems and methods, and to enable others skilled in the art to utilize the disclosed structures, systems and methods in such or in other embodiments and with various modifications required by the particular application or use. It is intended that the appended claims be construed to include alternative embodiments to the extent permitted by the prior art.

What is claimed is:

1. A composite structure, comprising:
a first component part, the first component part including:
a first sheet of thermoplastic fiber reinforced material, wherein the first sheet has an outside perimeter, wherein at least a first aperture is formed in the first sheet, and wherein the at least a first aperture of the first sheet is spaced apart from the outside perimeter;
a second component part, the second component part including:
a second sheet of thermoplastic fiber reinforced material, wherein the second sheet has an outside perimeter, wherein at least a first aperture is formed in the second sheet, wherein the at least a first aperture of the second sheet is spaced apart from the outside perimeter,
wherein the first component part is joined to the second component part,
wherein an interior volume is formed between at least a first portion of the first component part and a first portion of the second component part,
wherein the outside perimeter of the first sheet forms at least a portion of a first outside edge section of the first component part,
wherein the outside perimeter of the second sheet forms at least a portion of a first outside edge section of the second component part,
wherein the first aperture of the first sheet forms at least a portion of a first inside edge section of the first component part,
wherein the first aperture of the second sheet forms at least a portion of a first inside edge section of the second component part,
wherein the first sheet includes a first plurality of fibers,
wherein one end of each fiber in the first plurality of fibers forms a portion of the first outside edge section of the first component part, wherein another end of each fiber in a first subset of the first plurality of fibers forms a portion of a second outside edge section of the first component part, wherein another end of each fiber in a second subset of the first plurality of fibers forms a portion of the first inside edge section of the first component part, and wherein a second aperture is formed between a portion of the first component part and an adjacent portion of the second component part.

2. The composite structure of claim 1, wherein the first outside edge section of the first component part is separated from the second outside edge section of the first component part by a discontinuity at the second aperture.

3. The composite structure of claim 1, wherein the second sheet includes a second plurality of fibers, wherein one end of each fiber in the second plurality of fibers forms a portion of the first outside edge section of the second component part, wherein another end of each fiber in a first subset of the second plurality of fibers forms a portion of a second outside edge section of the second component part, and wherein another end of each fiber in a second subset of the second plurality of fibers forms a portion of the first inside edge section of the second component part.

4. The composite structure of claim 3, wherein the first component part further includes:
a third sheet of thermoplastic fiber reinforced material, wherein the third sheet is joined to the first sheet, wherein the third sheet has an outside perimeter, wherein a first aperture is formed in the third sheet, wherein the first aperture of the third sheet is spaced apart from the outside perimeter, wherein the third sheet includes a third plurality of fibers, wherein one end of each fiber in the third plurality of fibers forms a portion of a third outside edge section of the first component part, wherein another end of each fiber in a first subset of the third plurality of fibers forms a portion of a fourth outside edge section of the first component part, and wherein another end of each fiber in a second subset of the third plurality of fibers forms a portion of the first inside edge section of the first component part.

5. The composite structure of claim 1, wherein the first component part further includes:
a third sheet of thermoplastic fiber reinforced material, wherein the third sheet is joined to the first sheet of thermoplastic fiber reinforced material, and wherein the third sheet includes a plurality of randomly oriented fibers.

6. The composite structure of claim 5, wherein the third sheet is exterior to the interior volume.

7. The composite structure of claim 1, further comprising:
a first welding strip, wherein the first welding strip extends along a joint between the first outside edge section of the first component part and the first outside edge section of the second component part.

8. A composite panel, comprising:
a first sheet, the first sheet including:
a plurality of fibers;
a thermoplastic material, wherein the fibers are embedded in the thermoplastic material; and
a first aperture, wherein the first aperture of the first sheet is defined by at least a first inside edge portion of the first sheet, wherein the first sheet has an outside perimeter defined by a plurality of outside edge portions of the first sheet, wherein the plurality of outside edge portions of the first sheet includes first and second outside edge portions, and wherein the first aperture of the first sheet is entirely within the outside perimeter of the first sheet;

a second sheet, the second sheet including:
a plurality of fibers;
a thermoplastic material, wherein the fibers are embedded in the thermoplastic material; and
a first aperture, wherein the first aperture of the second sheet is defined by at least a first inside edge portion of the second sheet, wherein the second sheet has an outside perimeter defined by a plurality of outside edge portions of the second sheet, wherein the plurality of outside edge portions of the second sheet includes first and second outside edge portions, wherein the first aperture of the second sheet is entirely within the outside perimeter of the second sheet, wherein a first surface of the first sheet is joined to a first surface of the second sheet, wherein at least a portion of the first aperture of the first sheet is aligned with at least a portion of the first aperture of the second sheet to form an aperture in the composite panel, wherein at least a first subset of the fibers included in the plurality of fibers of the first sheet extend from the first outside edge portion of the first sheet to the second outside edge portion of the first sheet, wherein at least a second subset of the fibers included in the plurality of fibers of the first sheet extend from the first outside edge portion of the first sheet to the first inside edge portion of the first sheet, and wherein a first discontinuity is present in an area between the first outside edge portion of the first sheet and at least one of the second outside edge portion of the first sheet and a third outside edge portion of the first sheet.

9. The composite panel of claim 8, wherein at least most of the fibers included in the plurality of fibers of the second sheet are not parallel to the fibers included in the plurality of fibers of the first sheet.

10. The composite panel of claim 9, wherein the fibers included in the plurality of fibers of the second sheet are oriented randomly with respect to a plane extending across the edges of the second sheet.

11. A method of forming a composite structure, comprising:
forming a first composite panel, wherein the first composite panel includes at least a first sheet of a thermoplastic material containing a plurality of fibers, and wherein at least a first aperture is formed in the first composite panel;
heating the first composite panel;
placing the heated first composite panel in a first half of a first final mold, wherein the first composite panel is given a first final contour;
forming a second composite panel, wherein the second composite panel includes at least a second sheet of a thermoplastic material containing a plurality of fibers, and wherein at least a first aperture is formed in the second composite panel;
heating the second composite panel; and
placing the heated second composite panel in a second half of the first final mold, wherein the second composite panel is given a second final contour,
wherein the first composite panel includes at least a first outside edge and a second outside edge,
wherein the first composite panel includes an inside edge that is coincident with the first aperture of the first composite panel, wherein a first subset of fibers included in the plurality of fibers of the first composite panel have a first end that forms a portion of the first outside edge of the first composite panel and a second end that forms a portion of the second outside edge of the first composite panel, wherein a second subset of fibers included in the plurality of fibers of the first composite panel have a first end that forms a portion of the first outside edge of the first composite panel and a second end that forms a portion of the inside edge of the first composite panel, wherein the second composite panel includes an outside edge, wherein the second composite panel includes an inside edge that is coincident with the first aperture of the second composite panel, wherein the first composite panel is fused to the second composite panel to form a composite structure, wherein the first composite structure includes an interior volume between at least a first portion of the first composite panel and at least a first portion of the second composite panel, and wherein the composite structure includes a second aperture formed between a first discontinuity between at least two outside edge sections of the first composite panel and a first discontinuity between at least two outside edge sections of the second composite panel.

12. The method of claim 11, wherein forming the first composite panel includes joining the first sheet to a third sheet of thermoplastic material containing a plurality of fibers using heat and pressure.

13. The method of claim 12, wherein the third sheet includes a plurality of randomly oriented fibers.

14. The method of claim 11, further comprising heating the first and second composite panels in the first final mold, wherein portions of the first and second composite panels are fused together while heating the first and second composite panels in the first final mold.

15. The method of claim 14, wherein the first and second composite panels are formed at a temperature greater than a melting point of the thermoplastic material, and wherein the first composite panel is fused to the second composite panel at a temperature of greater than or equal to a glass transition temperature of the thermoplastic material and less than or equal to the melting point of the thermoplastic material.

16. The method of claim 13, wherein forming the second composite panel includes joining the second sheet to a fourth sheet of thermoplastic material containing a plurality of randomly oriented fibers, wherein the third and fourth sheets form outside surfaces of the composite structure.

17. The method of claim 16, wherein forming the first composite panel includes placing the first and third sheets in a first preform mold prior to placing the heated first composite panel in the first half of the first final mold, and wherein forming the second composite panel includes placing the second and fourth sheets in a second preform mold prior to placing the heated second composite panel in the second half of the first final mold.

18. The composite structure of claim 5, wherein the second component part further includes:
a fourth sheet of thermoplastic fiber reinforced material, wherein the fourth sheet is joined to the second sheet of the thermoplastic fiber reinforced material, wherein the fourth sheet includes a plurality of randomly oriented fibers, and wherein the third and fourth sheets form an exterior surface of the composite structure.

19. The composite structure of claim 4, wherein the second component part further includes:
a fourth sheet of thermoplastic fiber reinforced material, wherein the fourth sheet is joined to the second sheet, wherein the fourth sheet has an outside perimeter, wherein a first aperture is formed in the fourth sheet, wherein the first aperture of the fourth sheet is spaced apart from the outside perimeter, wherein the fourth sheet includes a fourth plurality of fibers, wherein one end of each fiber in the fourth plurality of fibers forms a portion of a third outside edge section of the second component part, wherein another end of each fiber in a first subset of the fourth plurality of fibers forms a portion of a fourth outside edge section of the second component part, wherein another end of each fiber in a second subset of the fourth plurality of fibers forms a portion of the first inside edge section of the second component part, and wherein the fibers in the second plurality of fibers are not parallel to the fibers in the fourth plurality of fibers; and
a fifth sheet of thermoplastic fiber reinforced material, wherein the fifth sheet is joined to the fourth sheet, wherein the fifth sheet includes a fifth plurality of fibers, and wherein the fifth plurality of fibers are randomly oriented, and wherein the first component part further includes:
a sixth sheet of thermoplastic fiber reinforced material, wherein the sixth sheet is joined to the third sheet, wherein the sixth sheet includes a sixth plurality of fibers, wherein the sixth plurality of fibers are randomly oriented, wherein the fibers in the first plurality of fibers are not parallel to the fibers in the third plurality of fibers, and wherein the fifth and sixth sheets form an exterior surface of the composite structure.

20. The composite structure of claim 1, wherein the portion of the first component part at which the second aperture is formed is between the first outside edge section and at least one of the second outside edge section and a third outside edge section.

* * * * *